United States Patent
Fishman et al.

(10) Patent No.: US 7,082,556 B2
(45) Date of Patent: Jul. 25, 2006

(54) SYSTEM AND METHOD OF DETECTING A BIT PROCESSING ERROR

(75) Inventors: Alex Fishman, Sunnyvale, CA (US); Konstantinos G. Haritos, Saratoga, CA (US); Paul Sung, Saratoga, CA (US); Dmitri Bannikov, Mountain View, CA (US); Serguei Dorofeev, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 665 days.

(21) Appl. No.: 10/285,081

(22) Filed: Oct. 31, 2002

(65) Prior Publication Data

US 2004/0153913 A1 Aug. 5, 2004

Related U.S. Application Data

(60) Provisional application No. 60/416,649, filed on Oct. 7, 2002.

(51) Int. Cl.
*G06F 11/00* (2006.01)

(52) U.S. Cl. .................. 714/704; 714/798; 714/799; 714/48

(58) Field of Classification Search ............... 714/799, 714/704, 50, 746, 738, 798, 48
See application file for complete search history.

(56) References Cited

U.S. PATENT DOCUMENTS

| | | | |
|---|---|---|---|
| 5,268,949 A | 12/1993 | Watanabe et al. | |
| 5,748,672 A | 5/1998 | Smith et al. | |
| 5,761,216 A | 6/1998 | Sotome et al. | |
| 6,661,836 B1 | 12/2003 | Dalal et al. | |
| 6,694,462 B1 | 2/2004 | Reiss et al. | |
| 6,859,902 B1 * | 2/2005 | Dalal et al. | 714/726 |
| 6,874,107 B1 * | 3/2005 | Lesea | 714/725 |

* cited by examiner

*Primary Examiner*—Albert Decady
*Assistant Examiner*—Esaw Abraham
(74) *Attorney, Agent, or Firm*—Workman Nydegger

(57) ABSTRACT

The present invention relates generally to an improvement in the ability of test systems to test bit processing capacities of electronic devices, and in particular an improvement in their ability to test the operation of an electronic device's transmitter and receiver circuitry. Data generated by a BERT is transmitted in an electrical form to a DUT and a master device. The DUT transmits data received in an electrical form to the master device in an optical form and the master device transmits data received in an electrical form to the DUT in an optical form. The master device and the DUT then transmit data received in an optical form back to the BERT in an electrical form. The data received from the DUT and the master device, respectively, is separately tested for bit errors. Do so enables to calculation of bit error rates for two distinguishable data paths through the DUT.

14 Claims, 5 Drawing Sheets

SYSTEM AND METHOD OF DETECTING A BIT PROCESSING ERROR

The present application claims priority, under 35 U.S.C. 119(e), to a U.S. Provisional Patent Application No. 60/416, 649, filed on Oct. 7, 2002, entitled "A SYSTEM AND METHOD OF DETECTING A BIT PROCESSING ERROR," and incorporated herein by reference.

RELATED APPLICATION

The present application is related to, and incorporates by reference, a U.S. patent application Ser. No. 10/285,082 entitled "A SYSTEM AND METHOD OF PROCESSING A DATA SIGNAL".

BRIEF DESCRIPTION OF THE INVENTION

The present invention relates generally to an improvement in the ability of test systems to test bit processing capacities of electronic devices, and in particular an improvement in their ability to test the operation of an electronic device's transmitter and receiver circuitry.

BACKGROUND OF THE INVENTION

A bit error rate ("BER") is a ratio of bits received, processed, and/or transmitted with errors to a total number of bits received, processed, and/or transmitted over a given period of time. A BER is typically expressed as ten to a negative power. If, for example, a transmission comprises 1 million bits and one of these bits is in error (e.g., a bit is a first logic state instead of a second logic state), the transmission has a BER of $10^{-6}$. The BER is useful because it may characterize the ability of a device to receive, process, and/or transmit bits.

Many devices are designed to receive, process, and then transmit a plurality of bits. An optoelectronic transceiver, for example, typically receives a plurality of bits in an electrical form and then transforms and transmits the bits in an optical form and/or receives a plurality of bits in an optical form and then transforms and transmits the bits in an electrical form.

To derive a BER for a device under test ("DUT"), bits transmitted to the DUT are compared to corresponding bits transmitted by the DUT or to corresponding bits in a pattern used to generate the bits transmitted to the DUT. In some applications, the BER of a DUT must be below a defined threshold for the DUT to pass a test.

A Bit Error Rate Test or Tester ("BERT") is a procedure or device that establishes a BER for a DUT or to otherwise quantify a DUT's ability to receive, process, and/or transmit bits. More specifically, a BERT measures the BER of a transmission (e.g., bits transmitted, received, or processed) over a given period of time by a DUT. An exemplary BERT includes, among other components, a serializer/deserializer ("SERDES") and a clock source fixed to a host board (e.g., PCB, circuit board, etc.). Typically, the SERDES produces serial encoded data (e.g., the bits) used to establish a BER for a DUT. More specifically, serial encoded data is transmitted from a SERDES to a DUT, which attempts to transmit the serial encoded data back to the SERDES. The SERDES compares the output of the DUT to the input to the DUT (or what the input should have been).

In prior art BERTs, however, only one BER is established for a DUT. More specifically, electrical data generated by the BERT is sent to the electrical input terminal of the DUT. This data is converted and transmitted through an optical output terminal of the DUT. But this optical output terminal is connected to optical input terminal of the DUT so that optical data transmitted by the DUT is looped back to the same DUT. Once this optical data is received by the DUT, is converted and transmitted through an electrical output terminal to the BERT. As a result, the source of bit errors that occur during such testing can not be attributed to a specific data path through the DUT. One data path starts at the electrical input terminal of the DUT and ends at the optical output terminal of the DUT. The other data path starts at the optical input terminal of the DUT and ends at the electrical output terminal of the DUT.

SUMMARY OF THE INVENTION

A system for detecting a bit processing error, including a first circuit, a second circuit, and comparison circuitry. The first circuit is electrically connectable to a first external device and the second circuit is electrically connectable to a second external device, which is a pre-tested device. The first circuit is configured to generate a sequence of bit groups by reference to a controlling pattern and transmit this sequence of bit groups in an electrical form to the first external device. The first external device is configured to, in turn, transmit the sequence of bit groups in an optical form to the second external device, which transmits the sequence of bit groups in an electrical form to the second circuit and the comparison circuitry. The second circuit is configured to generate a subsequent bit group from a first group of bits in the sequence of bit groups by reference to the same controlling pattern. The comparison circuitry is configured to execute a comparison of the subsequent bit group to a second bit group in the sequence of bit groups. The second bit group immediately follows the first bit group in the sequence of bit groups. An unsuccessful comparison is indicative of a bit processing error that is attributable to a first data path of the sequence of bit groups through the first external device.

The system may also include a duplicate second circuit and comparison circuitry, wherein the first circuit transmits the sequence of bit groups in an electrical form to the second external device while transmitting the sequence of bit groups to the first external device. The second external device is configured to, in turn, transmit the sequence of bit groups in an optical form to the first external device, which transmits the sequence of bit groups in an electrical form to the duplicate second circuit and the duplicate comparison circuitry. The duplicate second circuit is configured to generate a subsequent bit group from a first group of bits in the sequence of bit groups by reference to the same controlling pattern. The duplicate comparison circuitry is configured to execute a comparison of the subsequent bit group to a second bit group in the sequence of bit groups. An unsuccessful comparison is indicative of a bit processing error that is attributable to a second data path of the sequence of bits through the first external device.

A method of processing a data signal that includes generating a sequence of bit groups by reference to a controlling pattern. The method further includes transmitting this sequence of bit groups in an electrical form to a first external device. The first external device transmits the sequence of bit groups in an optical form to a second external device, which is a pre-tested device. The method further includes receiving the sequence of bit groups from the second external device. The method further includes generating a subsequent bit group from a group of bits in the sequence of bit groups by reference to the same controlling pattern. Finally, the method further includes executing a comparison of the subsequent bit group to a corresponding bit group in the sequence of bit groups received from the second external device. An unsuccessful comparison is attributable to a specific data path of the sequence of bits through the first external device.

The method may also include transmitting the sequence of bit groups in an electrical form to the second external device while transmitting the sequence of bit groups to the first external device. The second external device is configured to, in turn, transmit the sequence of bit groups in an optical form to the first external device, which transmits the sequence of bit groups in an electrical form to the duplicate second circuit and the duplicate comparison circuitry. The method further includes generating a subsequent bit group from a first group of bits in the sequence of bit groups by reference to the same controlling pattern. Finally, the method may further include executing a comparison of the subsequent bit group to a second bit group in the sequence of bit groups. An unsuccessful comparison is indicative of a bit processing error that is attributable to a second data path of the sequence of bits through the first external device.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
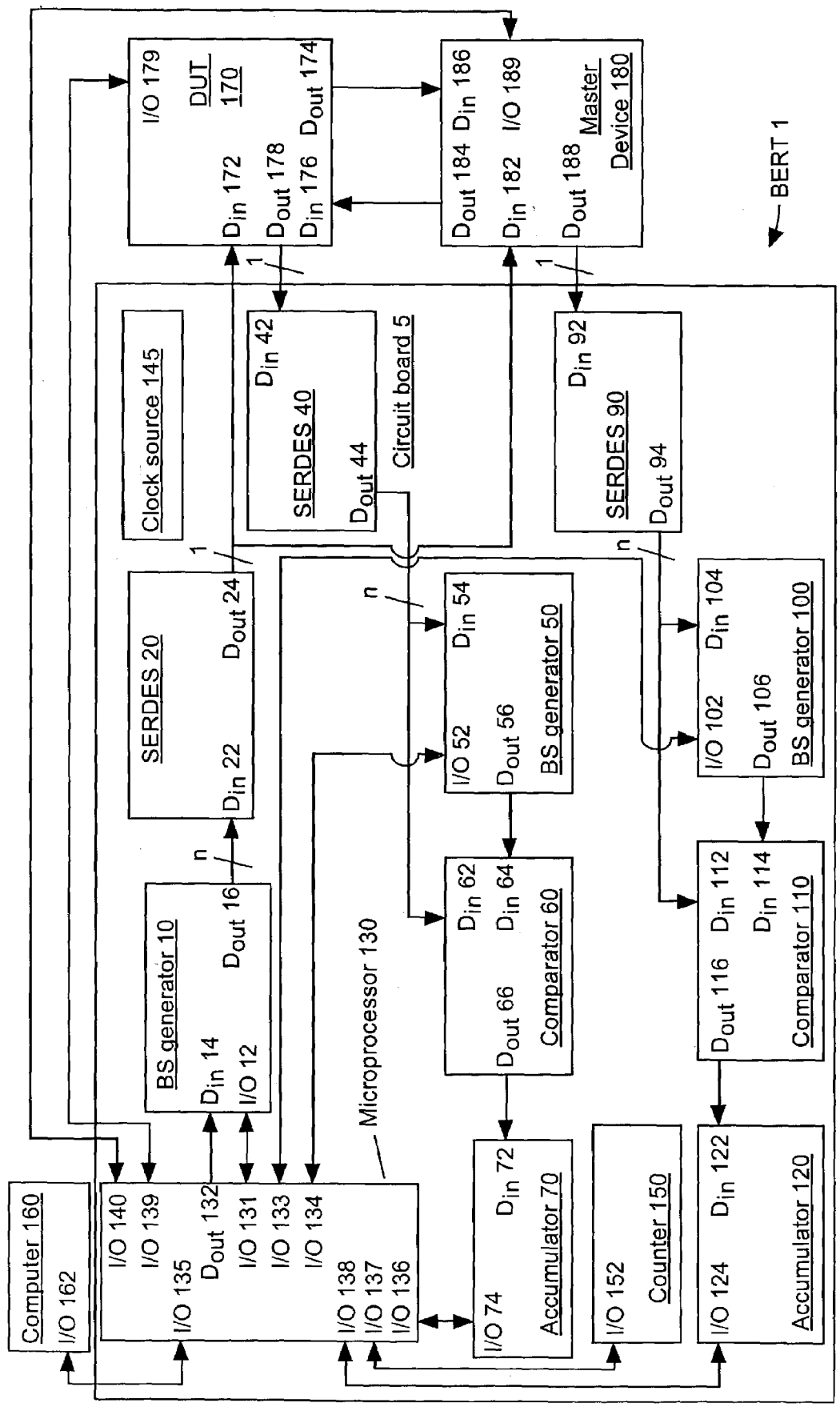
FIG. 1 is a block diagram of a BERT consistent with an embodiment of the present invention.

Referring to FIG. 1, there is shown a BERT 1 consistent with an embodiment of the present invention. As illustrated in FIG. 1, the BERT 1 includes a circuit board 5, a first bit sequence ("BS") generator 10, a first serializer/deserializer ("SERDES") 20, a second SERDES 40, a second BS generator 50, a first comparator 60, a first accumulator 70, a third SERDES 90, a third BS generator 100, a second comparator 110, a second accumulator 120, a microprocessor 130, a clock source 145, a timer 150, and a computer 160. Connected to the BERT 1, as illustrated in FIG. 1, are a device under test ("DUT") 170 and a master device 180.

The circuit board 5 is typically an insulated board that houses interconnected circuitry. The circuit board 5 typically provides power and ground connections (not illustrated) for various components mounted thereon.

The BS generators illustrated in FIG. 1 (i.e., the first BS generator 10, the second BS generator 50, and the third BS generator 100) are typically one or more types of linear feedback shift registers. For example, a given BS generator may be a binary shift register with taps that are modulo-2 added together and fed back to the binary shift register as input. Persons skilled in the art recognize that the configuration and function of the taps, or similar circuitry, typically define bit sequences produced by a BS generator. In particular, these configurations and functionalities define a second bit group that is produced when a first bit group is input to a BS generator.

The bit groups generated by a BS generator are typically output simultaneously in parallel form, but may be output serially as well. Additionally, bit sequences generated by a BS generator are preferably pseudo random bit sequences (or other deterministic sequences such as Gold, JPL, and Barker Codes). As a result, a plurality of BS generators can be configured in the same way so that each produces the same bit group from like input.

The BS generators illustrated in FIG. 1 preferably include an I/O port, a $D_{in}$ port and an $D_{out}$ port (i.e., the I/O port 12, $D_{in}$ port 14, and $D_{out}$ port 16, the I/O port 52, $D_{in}$ port 54, and $D_{out}$ port 56, and the I/O port 102, $D_{in}$ port 104, and $D_{out}$ port 106 of the first, second, and third BS generator, respectively).

The $D_{in}$ port is typically a parallel port (n signals, channels, lines, etc.), but may be a serial port (1 signal, channel, line, etc.), that is used to receive data such as bit groups (e.g., a seed value that identifies a starting bit group in a sequence of bits). And the $D_{out}$ port is typically a parallel port, but may be a serial port, that is used to transmit bit groups.

The I/O port may be a parallel or serial port that is used to receive control signals from the microprocessor 130. These control signals may, for example, configure a BS generator (e.g., configure the taps or similar circuitry that typically defines the type of bit sequences produced and the cycle length, uniformity, and independence of these bit sequences) and initiate and/or terminate the generation of a bit sequence by a BS generator.

The second SERDES 40 and the third SERDES 90 illustrated in FIG. 1 are typically devices, such as a Texas Instruments® Multirate Transceiver SLK2701, for receiving data serially and transmitting this data in parallel. And the first SERDES 20 is typically a device, such as an ON Semiconductor® 8-Bit parallel to serial converter MC100EP446, for receiving data in parallel and transmitting this data serially.

As illustrated in FIG. 1, a SERDES preferably includes a $D_{in}$ port and a $D_{out}$ port (i.e., the $D_{in}$ port 22 and $D_{out}$ port 24, the $D_{in}$ port 42 and $D_{out}$ port 44, and the $D_{in}$ port 92 and $D_{out}$ port 94 of the first, second, and third SERDES, respectively). With respect to the first SERDES 20, a $D_{in}$ port is typically used to receive bit groups in parallel and the $D_{out}$ port is typically used to serially transmit bit groups received through the $D_{in}$ port. And with respect to the second SERDES 40 and the third SERDES 90, a $D_{in}$ port is typically used to receive bit groups serially and the $D_{out}$ port is typically used to transmit bit groups received serially in parallel.

A SERDES may also include one or more ports (not illustrated) for exchanging control signals with the microprocessor 130. These ports enable the microprocessor 130 to, for example, control how the SERDES receives, transforms, and transmits data. These ports may, furthermore, include a plurality of separate signals for address bits, an alarm interrupt, a chip select, a write input, a read input, a bus type select, a test input, and an address latch enable.

A SERDES may also include circuitry for extracting a clock signal from data received serially. This clock signal, moreover, may be transmitted to the accumulators 70, 120, the comparators 60, 110, and the second and third BS generators 50, 100 (connections not illustrated).

The comparators illustrated in FIG. 1 (i.e., the first comparator 60 and the second comparator 110) are preferably circuitry for comparing a first group of bits to a second group of bits. More specifically, a comparator compares bits of like position within their respective group of bits (e.g., the second bit in a first group of bits is compared to the second bit in a second group of bits). In addition to making such comparisons, the comparators preferably provide comparison results. The results may include a count of the bits that do not match or indicate only whether all of the bits match.

As illustrated in FIG. 1, a comparator preferably includes two $D_{in}$ ports and one $D_{out}$ port (i.e., the $D_{in}$ port 62, $D_{in}$ port 64, and $D_{out}$ port 66 and the $D_{in}$ port 112, $D_{in}$ port 114, and $D_{out}$ port 116 of the first and second comparator, respectively). The $D_{in}$ ports are typically used to receive bits transmitted by circuitry on the circuit board 5 (e.g., a SERDES and a BS generator). The $D_{out}$ ports are typically used to transmit bit comparison results to additional circuitry on the circuit board 5. The $D_{out}$ port preferably has enough bandwidth to transmit bit comparison results in a single clock cycle. For example, if a comparator indicates only whether all of the bits match, the $D_{out}$ port may be a serial port such that the result of a comparison is either a digital one or zero or a high or low voltage level. But if a comparator produces a count of bits that do not match, the $D_{out}$ port may be a parallel port such that the result of a comparison is a set of digital ones or zeros or a high or low voltage levels.

The comparators may also include one or more ports (not illustrated) for exchanging control signals with the microprocessor 130. These ports enable the microprocessor 130 to control how the comparators receive and compare bits and transmit comparison results. These ports may, furthermore, include a plurality of separate leads.

The accumulators illustrated in FIG. 1 (i.e., the first accumulator 70 and the second accumulator 120) are preferably circuitry for storing the results of bit comparisons. More specifically, an accumulator is typically formed by a set of flip-flops or other circuitry capable of storing data (e.g., digital ones and zeros). The accumulators are preferably configured to add numerical input to an internally stored value and maintain the resulting value.

As illustrated in FIG. 1, an accumulator preferably includes a $D_{in}$ port and an I/O port (i.e., $D_{in}$ port 72 and I/O port 74 and the $D_{in}$ port 122 and I/O port 124 of the first and second accumulator, respectively). A $D_{in}$ port is typically used to receive bit comparison results from other circuitry on the circuit board 5. Similarly, an I/O port is typically used to receive commands to reset and start or stop accumulating comparison results and to transmit bit comparison results stored in the accumulator to other circuitry on the circuit board 5. $D_{in}$ and $D_{out}$ ports are typically parallel ports with enough bandwidth to receive and transmit data and/or control signals in a single clock cycle.

The microprocessor 130 typically comprises a computer processor on a microchip (e.g., a Motorola® 8-bit processor). The microprocessor 130 directs the operation of circuitry on the circuit board 5 (not all connections illustrated). In particular, the microprocessor 130 may configure the BS generators, trigger or terminate the generation of bit sequences by the BS generators, and process bit comparison results. Preferably, the microprocessor 130 completes these tasks, under the direction of the computer 160. In preferred embodiments of the present invention, the microprocessor 130 may not have the capacity to perform tests, which are described below, without the computer 160.

The microprocessor 130 preferably includes a first I/O port 131, a $D_{out}$ port 132, a second I/O port 133, a third I/O port 134, a fourth I/O port 135, a fifth I/O port 136, a sixth I/O port 137, and a seventh I/O port 138.

The microprocessor 130 preferably sends data to the first BS generator 10 through the $D_{out}$ port 134. This data is typically a seed value for the generation of a bit sequence, but may be other data as well. Additionally, the microprocessor 130 transmits and receives control signals, configuration data, etc. to the three BS generators illustrated in FIG. 1 through the first I/O port 132, the third I/O port 134, and the second I/O port 133, respectively. The microprocessor 130 may send and receive control signals, configuration data, etc. to some or all of the other circuitry and/or devices illustrated in FIG. 1 without departing from the scope of the present invention.

The microprocessor 130 exchanges commands and data with the computer 160 through the fourth I/O port 135. In preferred embodiments, the computer 160 exchanges control signals and/or data with the microprocessor 130, which interacts with some or all of the other circuitry on the circuit board 5, to setup, initiate, and monitor tests of the DUT 170.

The microprocessor transmits and receives control signals and data, respectively, with the timer 150 via the sixth I/O port 137. In particular, the microprocessor 130 may clear the timer 150 and read the value of the timer 150 via the sixth I/O port 137.

Finally, the microprocessor 130 communicates with the first and second accumulator through the fifth I/O port 136 and the seventh I/O port 138, respectively. Typically, this communication includes reading bit comparison results stored by the accumulators 70, 120 and clearing the values stored by the accumulators 70, 120.

The clock source 145 is designed to provide a clock signal at a desired frequency. The clock source 110 may comprise a single, self contained circuit (e.g., a Amptron® or Cardinal Components, Inc. crystal based oscillator). Such circuits are preferably single frequency circuits, but the clock source 110 may also have multiple-frequency capability. The clock source 145 may also comprise a plurality of circuits including a primary circuit and external timing components.

Preferably, the clock source 145 includes a plurality of ports to communicate a clock signal to some or all of the circuitry and devices illustrated in FIG. 1 (e.g., the microprocessor 130, the first BS generator 10, and the first SERDES 20—ports and connections not illustrated). The clock source 145 preferably includes an I/O port to receive configuration data from the microprocessor 130 (e.g., a desired frequency) (ports and connection not illustrated). Also not illustrated in FIG. 1 are one or more demultiplexers and/or one or more dividers or multipliers that may be used to enable the clock source 145 to drive two or more components at one or more frequencies.

The timer 150 is designed to count clock cycles that occur during a test of the DUT 170. Because the duration of a clock cycle is known, the duration of a test can be equated to a specific number of clock cycles. As indicated above, the timer 150 preferably includes an I/O port 152 to transmit data to and receive commands from the microprocessor 130. The timer 150 also preferably includes a port (not illustrated) to receive clock signal input (e.g., clock signal input from the clock source 145). Each time a pulse of this clock signal input is received, the timer 150 preferably increments.

The DUT 170 and the master device 180 are typically any electronic device capable of receiving, transforming, and transmitting a data signal along two distinguishable data paths. More specifically, these devices are typically optoelectronic transceivers. These devices are capable of receiving a data signal in an electrical form and transmitting the data signal in an optical form and receiving a data signal in an optical form and transmitting the data signal in an electrical form.

See the U.S. patent application Ser. No. 10/005,924—entitled "CIRCUIT INTERCONNECT FOR OPTOELEC- TRONIC DEVICE FOR CONTROLLED IMPEDANCE AT HIGH FREQUENCIES," filed on Dec. 4, 2001, and incorporated herein by reference—for a detailed description of an optoelectronic device consistent with the external devices illustrated in FIG. 1. The aforementioned application and the present application share a common assignee.

Each of these devices preferably include two sets of $D_{in}$ and $D_{out}$ ports (e.g., the $D_{in}$ port 172, $D_{out}$ port 174, $D_{in}$ port 176, and $D_{out}$ port 178 and the $D_{in}$ port 182, $D_{out}$ port 184, $D_{in}$ port 186, and $D_{out}$ port 188 of the DUT 170 and the master device 180, respectively) and an I/O port (e.g., the I/O port 179 and the I/O port 189). As indicated above, two sets of $D_{in}$ and $D_{out}$ ports permit the flow of data in two directions through these devices (e.g., provide the distinguishable data paths through a device). Two of the $D_{in}$ ports (e.g., the $D_{in}$ port 172 and the $D_{in}$ port 182) are configured to receive data from the first SERDES 20. The other two of the $D_{in}$ ports (e.g., the $D_{in}$ port 176 and the $D_{in}$ port 186) are configured to receive data from another external device (e.g., the DUT 170 or the master device 180). Similarly, two of the $D_{out}$ ports (e.g., the $D_{out}$ port 178 and the $D_{out}$ port 188) are configured to transmit data to one of two SERDES (e.g., the second SERDES 40 or the third SERDES 90). The other two of the $D_{out}$ ports (e.g., the $D_{out}$ port 174 and the $D_{out}$ port 184) are configured to transmit data to another external device (e.g., the DUT 170 or the master device 180). The I/O ports are used to exchange control signals with the microprocessor 130. In particular, the DUT 170 and/or the master device 180 may receive, for example, Transmitter Disable and Rate Select signals from the microprocessor 130 and transmit, for example, Transmitter Fault and RxLOS signals to the microprocessor 130.

The master device 180 is preferably a device that has already been tested successfully. Its use facilitates separate testing of both sets of $D_{in}$ and $D_{out}$ ports on, or data paths through, the DUT 170, which is a device that has not already been tested successfully. In other words, data transmitted through a first set of $D_{in}$ and $D_{out}$ ports (e.g., the $D_{in}$ port 172 and the $D_{out}$ port 174) on the DUT 170 is not also transmitted through the other set of $D_{in}$ and $D_{out}$ ports (e.g., the $D_{in}$ port 176 and the $D_{out}$ port 178) during a test. As a result, any problems that occur while transmitting data through the DUT 170 are attributable to a specific set of $D_{in}$ and $D_{out}$ ports or data paths.

In preferred embodiments, data is transmitted to either the DUT 170 or the master device 180 in an electrical form. However, data transmitted by the DUT 170 to the mater device 180 and by the master device 180 to the DUT 170 is preferably in an optical form. As a result, both the DUT 170 and the master device 180 may transform data from an electrical form to an optical form and from an optical form to an electrical form while transmitting the data.

Figure 2:
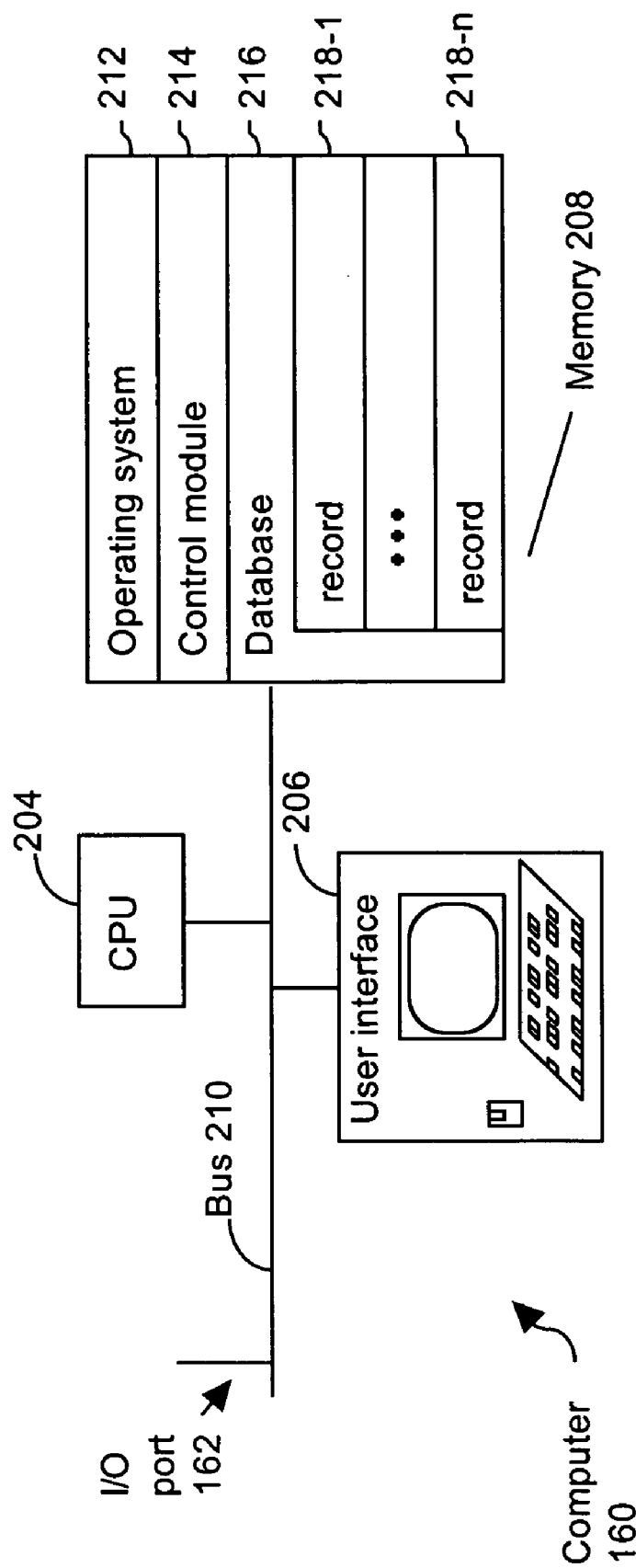
FIG. 2 is a block diagram of a computer consistent with an embodiment of the present invention.

Referring to FIG. 2, there is shown a more detailed illustration of the computer 160. In addition to the I/O port 162 illustrated in FIG. 1, the computer 160 preferably includes standard computer components such as one or more processing units 204, a user interface 206 (e.g., keyboard, mouse, and a display), memory 208, and one or more busses 210 to interconnect these components. The memory 208, which typically includes high speed random access memory as well as non-volatile storage such as disk storage, may store an operating system 212, a control module 214, and a database (or one or more files) 216, which may include a plurality of records 218. The operating system 367 may include procedures for handling various basic system services and for performing hardware dependent tasks. The one or more processing units 204 may execute, for example, tasks for the control module 214 under the direction of the operating system 212. The operating system may also provide the control module 214 with access to other system resources such as the memory 208 and the user interface 206.

The control module 214 is designed to manipulate the BERT 1 in accordance with the present invention. In particular, the control module 214 preferably interacts with the microprocessor 130 through the I/O port 210 to initiate and monitor tests of the DUT 170. As described in more detail below, the control module 214 directs the microprocessor 130 to initialize one or more other components included in the BERT 1 and, if need be, to obtain information about the one or more other components that are not connected directly to the computer 160. The control module 214 engages in such communication with the microprocessor 130 before, during, and after tests of the DUT 170. The control module 214 may communicate results of DUT tests through the user interface 206 as needed. Finally, the computer 160 may communicate with other devices, such as Digital Communication Analyzers (not illustrated), during the testing of a DUT 170. Persons skilled in the art recognize that a Digital Communication Analyzer can provide additional information about the operation of a DUT 170 by monitoring the data transmitted by the DUT 170 as described in the related application incorporated above.

Although separate ports are illustrated in FIGS. 1 and 2 and discussed above with respect to various circuitry, some embodiments of the present invention may include additional or fewer ports without departing from the scope of the present invention. For example, a single data bus with address bits and corresponding ports may be substituted for some or all of the data ports (e.g., $D_{in}$ port 22, $D_{out}$ port 94, etc.) and corresponding connections illustrated in FIG. 1. Additionally, some or all of the port connections, though illustrated in FIGS. 1 and 2 as single leads, may be formed by a plurality of separate leads. The configuration illustrated in FIGS. 1 and 2, therefore, represents just one embodiment and is not meant to limit the scope of the present invention.

Figure 3A:
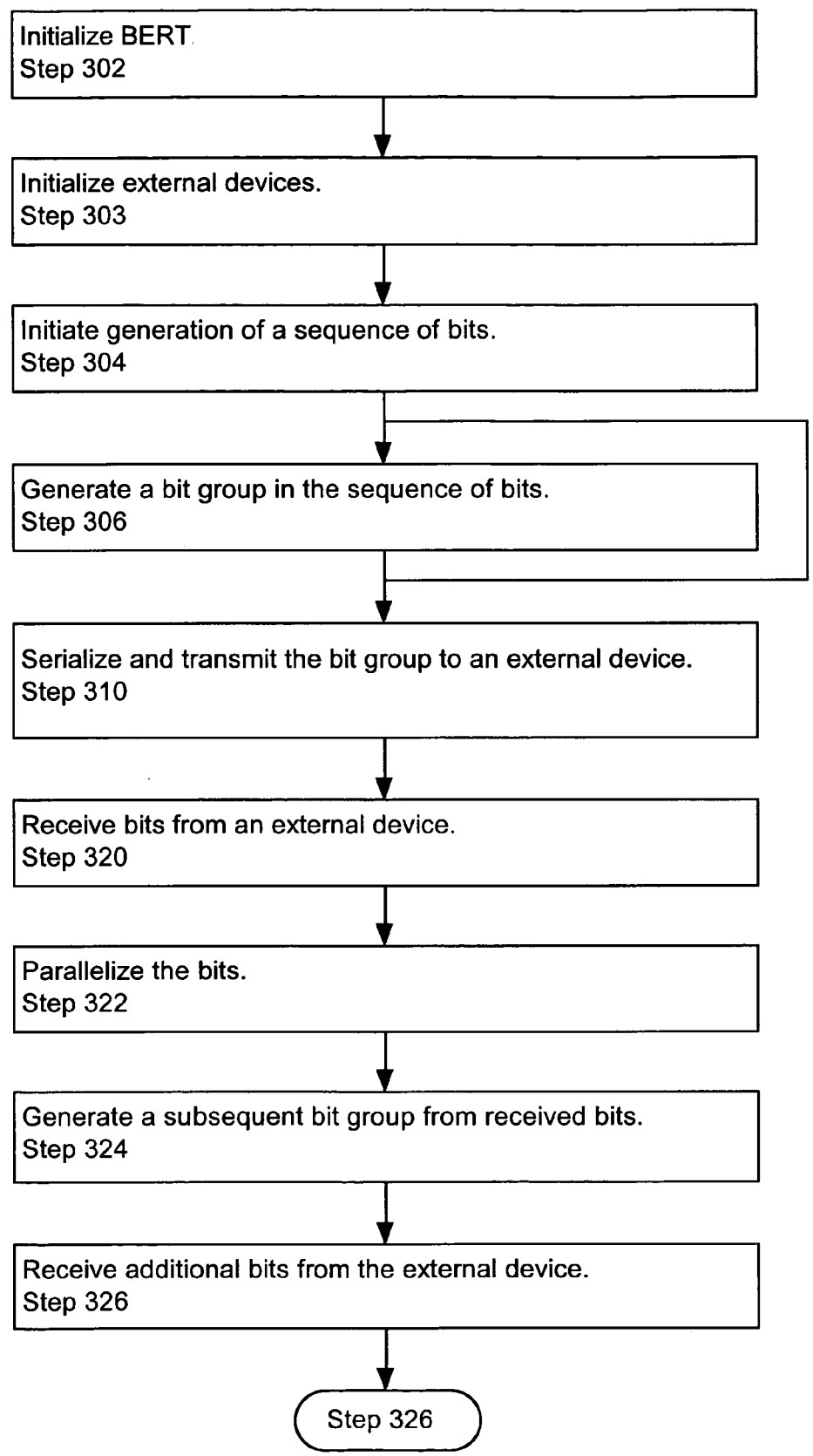
FIGS. 3A, 3B, and 3C illustrate processing steps consistent with an embodiment of the present invention.
Figure 3B:
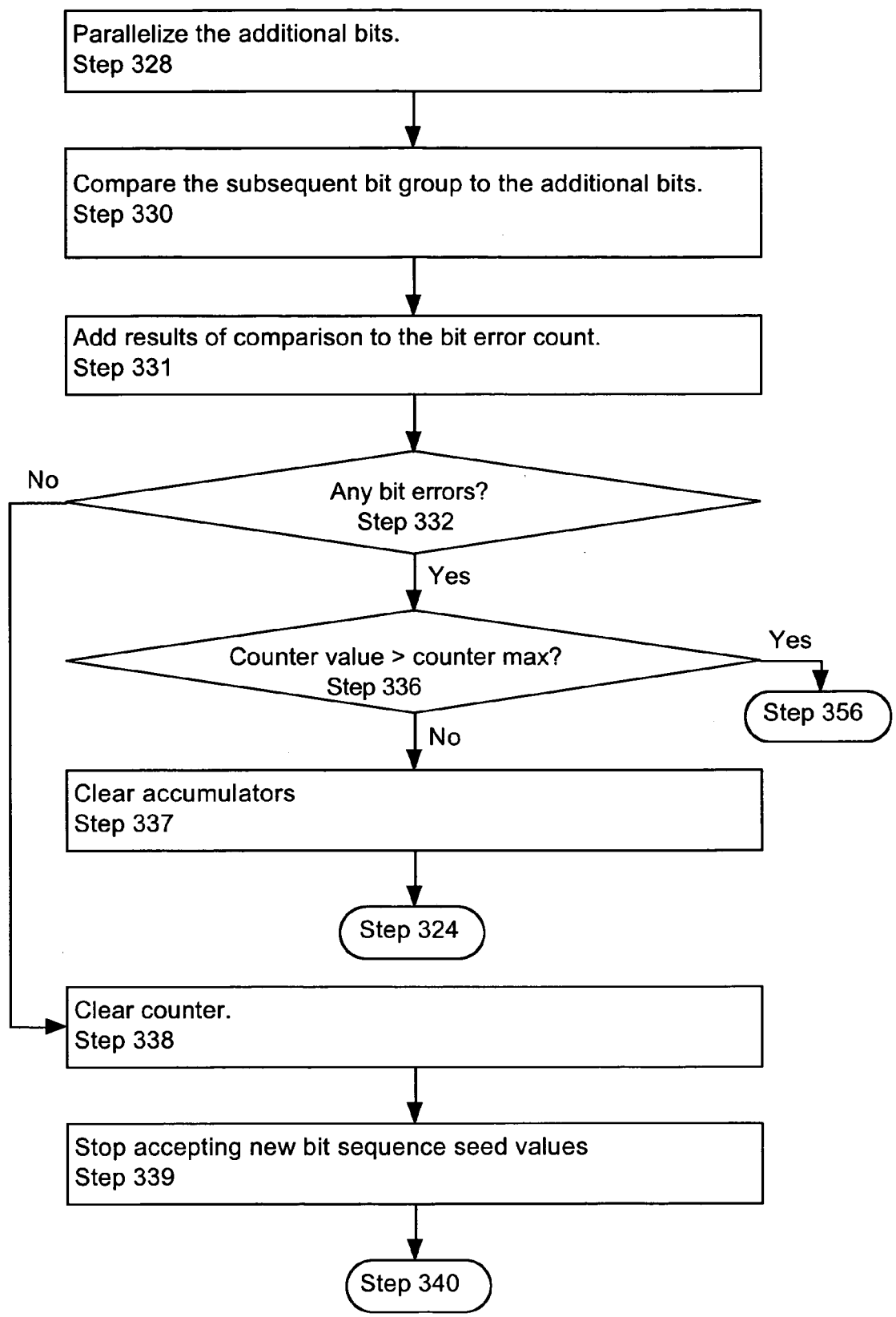
Figure 3C:
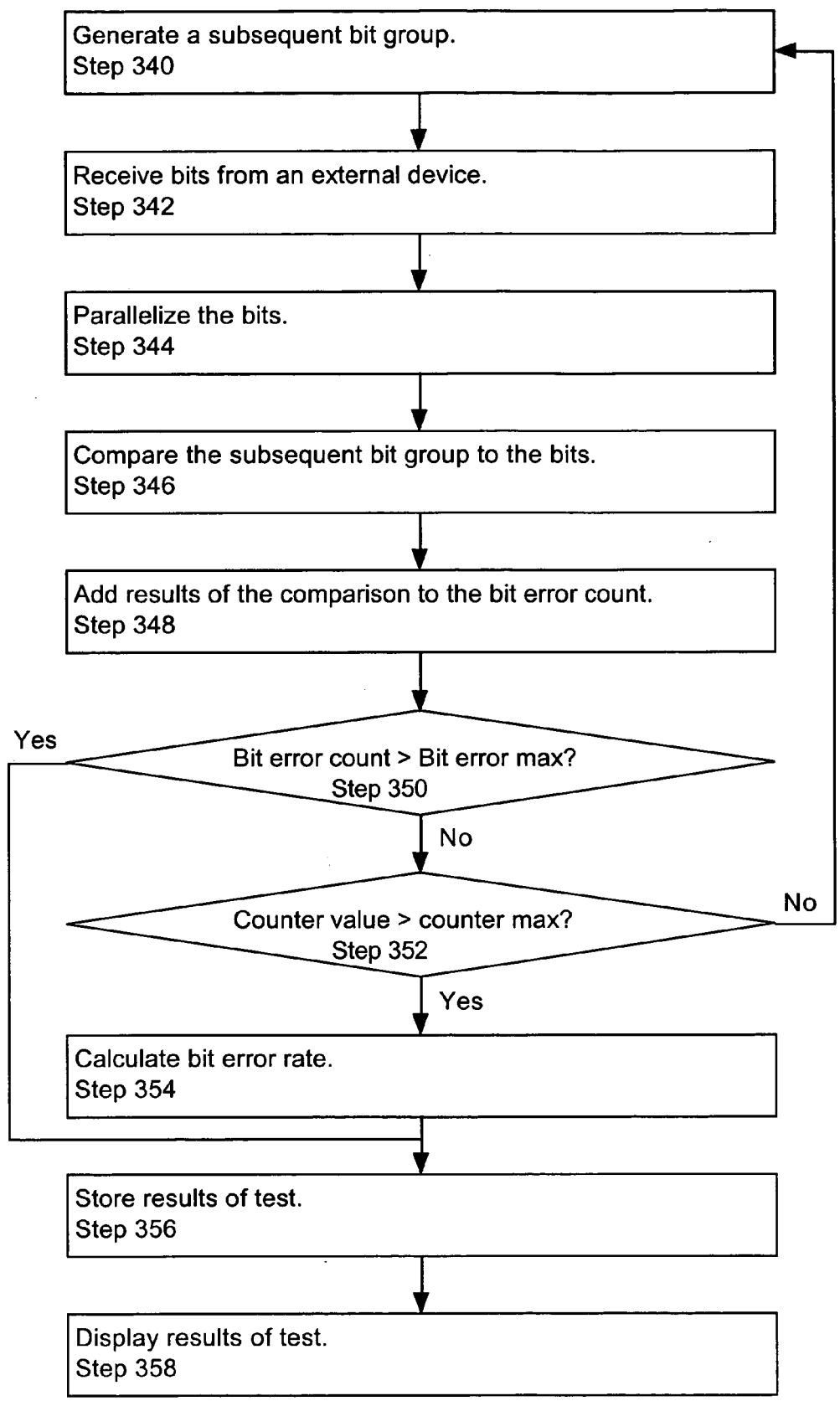

Referring to FIGS. 3A, 3B, and 3C, there are shown a series of processing steps included in a preferred embodiment of the present invention. The steps of FIGS. 3A, 3B, and 3C may be conceptually divided into four, somewhat overlapping phases. In a first phase (e.g., steps 302–303), the circuitry and devices illustrated in FIG. 1 are initialized. In a second phase (e.g., steps 304–336), the proper setup and connections of the BERT 1, the DUT 170, and the master device 180 are confirmed and seed values used by the second and third BS generators during the third phase are identified. The second phase preferably continues until the DUT 170 transmits consecutive groups of bits without any bit errors or until it times out. In a third phase (e.g., steps 338–352), bit errors, if any, are counted while the DUT 170 transmits a sequence of bits. In some embodiments, the third phase lasts long enough to establish a reliable bit error rate (e.g., long enough to transmit $10^6$ to $10^{15}$ bits). The actual length of the test or the number of bit groups transmitted during a test may vary from one embodiment to another. In a fourth phase (e.g., steps 354–358), one or more bit error rates are calculated for the DUT 170 and/or the results of the DUT 170 testing are displayed.

In a first step, the control module 214 initializes the BERT 1 (step 302, FIG. 3A). In particular, the control module 214 preferably directs the microprocessor 130 to set the clock frequency of the clock signal generated by the clock source 145 and to turn the clock source 145 on. The control module 214 may also direct the microprocessor 130 to set the length, type, and other characteristics of bit sequences generated by the BS generators. The microprocessor 130 accomplishes this task by, for example, transmitting control signals through its first I/O port 131, second I/O port 133, and third I/O port 134 to the I/O port 12, the I/O port 52, and the I/O port 102 of the first, second, and third BS generators 10, 50, 100, respectively. The control module 214 may also direct the microprocessor 130 to clear the timer 150 and set the values stored by the accumulators 70, 120 to zero. The microprocessor 130 accomplishes this task by, for example, transmitting control signals through its sixth I/O port 137, fifth I/O port 136, and seventh I/O port 138 to the I/O port 152, the I/O port 74, and the I/O port 124 of the timer 150 and the first and second accumulators 70, 120, respectively. Finally, the control module 214 may create a new record 218 in the database 216 to store results of a DUT 170 test.

The control module 214 then initializes external devices (step 303). In particular, the control module 214 preferably directs the microprocessor 130 to enable the optical transmission capabilities of the DUT 170 and the master device 180 by, for example, adjusting the state of a Transmitter Disable control signal. The DUT 170 and the master device 180 can then transmit electrical data received from the first SERDES 20 optically to each other at the selected data rate. More specifically, the microprocessor 130, under the direction of the control module 214, may transmit these control signals through its I/O port 139 to the I/O port 179 of the DUT 170 and through its I/O port 140 to the I/O port 189 of the master device 180.

The control module 214 then initiates the generation of a sequence of bits (step 304). This task is preferably completed by the microprocessor 130, under the direction of the control module 214. In particular, the microprocessor 130 may transmit a seed value through its $D_{out}$ port 132 to the $D_{in}$ port 14 of the first BS generator 10. In some embodiments of the present invention, the microprocessor 130, under the direction of the control module 214, also transmits a control signal through its I/O port 131 to the I/O port 12 of the first BS generator 10 to enable the generation of the sequence of bits by the BS generator 10.

In response to step 304, the first BS generator 10 begins generating a sequence of bits by generating a bit group in the sequence of bits (step 306). In preferred embodiments of the present invention, bit groups are generated sequentially and transmitted in parallel. The BS generator 10 preferably operates (i.e., generates bit groups) at the frequency of the clock signal generated by the clock source 145 (connections not illustrated). And as illustrated in FIG. 3A, the first BS generator 10 continues to generate bit groups in the sequence of bits (repeating the sequence of bits if necessary) until disabled by the microprocessor 130.

Each bit group generated by the first BS generator 10 is serialized by the first SERDES 20 and transmitted to the external devices (e.g., the DUT 170 and the master device 180) (step 310). In other words, the SERDES 20 receives bit groups through its $D_{in}$ port 22 from the first BS generator 10 in parallel, but transmits these bit groups serially through its $D_{out}$ port 24. And again, embodiments of the present invention may separately test the ability of a DUT 170 to receive, transform, and transmit bits in two directions or along distinguishable data paths (e.g., receive a bit group in an electrical form and transmit this bit group in an optical form and receive a bit group in an optical form and transmit this bit group in an electrical form) without modifying the BERT 1, the DUT 170, and the master device 180 configuration. By transmitting the bits simultaneously (e.g., during the same clock cycle) to both the DUT 170 and the master device 180, such testing is conducted in parallel.

The DUT 170 receives bits transmitted by the SERDES 20 through its $D_{in}$ port 172 in an electrical form and transmits them in an optical form through its $D_{out}$ port 174 to the master device 180. The master device 180 receives bits transmitted by the DUT 170 through its $D_{in}$ port 186 in an optical form and transmits them in an electrical form through its $D_{out}$ port 188 to the third SERDES 90.

The master device 180 receives bits transmitted by the SERDES 20 through its $D_{in}$ port 182 in an electrical form and transmits them in an optical form through its $D_{out}$ port 184 to the DUT 170. The DUT 170 receives bits transmitted by the master device 180 through its $D_{in}$ port 176 in an optical form and transmits them in an electrical form through its $D_{out}$ port 178 to the second SERDES 40.

The third SERDES 90 separately receives bits transmitted by the master device 180 (step 320) and then parallelizes them (step 322). More specifically, the third SERDES 90 receives bits transmitted serially by the master device 180 through its $D_{in}$ port 92 and transmits these bits as a bit group in parallel through its $D_{out}$ port 94 to both the second comparator 110 and the third BS generator 100. The third SERDES 90 also preferably recovers a clock signal from the data received from the master device 180 and transmits this recovered clock signal to the second comparator 110, the third BS generator 100, and the second accumulator 120 as well (connections not illustrated). Further, the BERT 1 may include additional circuitry to resynchronize this recovered clock signal with the clock signal that drives the first SERDES 20.

Similarly, the second SERDES 40 separately receives bits transmitted by the DUT 170 (step 320) and parallelizes them (step 322). More specifically, the second SERDES 40 receives bits transmitted serially by the DUT 170 through its $D_{in}$ port 42 and transmits these bits as a bit group in parallel through its $D_{out}$ port 44 to both the first comparator 60 and the second BS generator 50. The second SERDES 40 preferably recovers a clock signal from the data received from the DUT 170 and transmits this recovered clock signal to the first comparator 60, the second BS generator 50, and the first accumulator 70 as well (connections not illustrated). Further, the BERT 1 may include additional circuitry to resynchronize this recovered clock signal with the clock signal that drives the first SERDES 20.

The third BS generator 100 generates a subsequent bit group from the bit group received through its $D_{in}$ port 104 from the third SERDES 90 (step 324). Bit sequences generated by the BS generators illustrated in FIG. 1 are deterministic, so when configured in the same manner, these BS generators generate the same bit group from a given bit group. The output of the first BS generator 10 is typically fed back to the first BS generator 10 to generate another bit group in the sequence of bits. Similarly, the third BS generator 100 uses the bit group transmitted to it by the third SERDES 90 as seed values to generate a subsequent bit group in the sequence of bits. Because the third BS generator 100 is configured to produce the same sequence of bits as the first BS generator 10, the third BS generator 100 generates the same bit group that the first BS generator 10 generates from a given bit group.

The subsequent bit group is transmitted by the third BS generator 100 through its $D_{out}$ port 106 to the $D_{in}$ port 114 of the second comparator 110, but the subsequent bit group is not output by the third BS generator 100 until a subsequent clock cycle. And while the third SERDES 90 transmits the bit group to the BS generator 100 in step 322, the third SERDES 90 also receives another bit group from the master device 180 (step 326, FIG. 3B) and then parallelizes this bit group (step 328). As indicated above, parallelizing a bit group includes transmitting the bits in parallel to both the comparator 110 and the BS generator 100. So the bit group received in step 326 is transmitted to the comparator 110 during the same clock cycle in which the subsequent bit group generated by the BS generator 100 in step 324 is transmitted to the comparator 10.

Similarly, the second BS generator 50 generates a subsequent bit group through its $D_{in}$ port 104 from the bit group received from the second SERDES 40 (step 324). The subsequent bit group is transmitted by the second BS generator 50 through its $D_{out}$ port 56 to the $D_{in}$ port 64 of the first comparator 60, but the subsequent bit group is not output by the second BS generator 50 until a subsequent clock cycle. And while the second SERDES 40 transmits the bit group to the BS generator 50 in step 322, the second SERDES 40 also receives another bit group from the DUT 170 (step 326) and then parallelizes this bit group (step 328). The bit group received in step 326 is transmitted to the comparator 60 during the same clock cycle in which the subsequent bit group generated by the BS generator 50 in step 324 is transmitted to the comparator 60.

The second comparator 110 compares the bit groups transmitted by the third SERDES 90 and the third BS generator 100, respectively (step 330). More specifically, the second accumulator 110 receives a bit group through its $D_{in}$ port 112 from the third SERDES 90 and a bit group through its $D_{in}$ port 114 from the third BS generator 100. The results of the comparison made by the second comparator 110 are output through its $D_{out}$ 116 port to the $D_{in}$ port 122 of the second accumulator 120 and added to the value stored therein (step 331).

Similarly, the first comparator 60 compares the bit groups transmitted by the second SERDES 40 and the second BS generator 50, respectively (step 330). More specifically, the first accumulator 60 receives a bit group through its $D_{in}$ port 62 from the second SERDES 40 and a bit group through its $D_{in}$ port 64 from the second BS generator 50. The results of the comparison made by the first comparator 60 are output through its $D_{out}$ 66 port to the $D_{in}$ port 72 of the first accumulator 120 and added to the value stored therein (step 331).

The control module 214 then checks, via the microprocessor 130, for bit errors detected by the comparators (step 332). More specifically, the control module 214 determines whether the values stored in the first and second accumulators 70, 120 are both equal to zero. Typically, the control module 214 makes this determination during each cycle of the clock signal generated by the clock source 145. As noted above, the microprocessor may access these value through its fifth I/O port 136 and seventh I/O port 138 and the I/O ports 74, 124 of the first and second accumulators 70, 120, respectively.

If there are bit errors (e.g., both accumulators are not set to zero) (step 332—Yes), the control module 214 then checks, via the microprocessor 130, the value of the timer 150 to determine whether it is greater than a predefined timer value (e.g., a timer value maximum) (step 336), which may be maintained by either the microprocessor 130 or the computer 160. The microprocessor 130 may read the value stored by the timer 150 through its sixth I/O port 137 and the I/O port 152 of the timer 150.

As noted above, the purpose of the second phase is to confirm proper setup and the connections of the BERT 1, the DUT 170, and the master device 180 and to identify seed values for the second and third BS generators. If the value of the timer 150 exceeds the predefined timer value, it may be safely assumed that the BERT 1, the DUT 170, and the master device 180 are not setup and/or connected properly.

If the timer value is not greater than the predefined timer value (step 336—No), the microprocessor 130, under the direction of the control module 214, clears the value of the accumulators 70, 120 (step 337). As indicated above, the microprocessor 130 may clear the value of the accumulators 70, 120 through its fifth I/O port 136 and seventh I/O port 138 and the I/O ports 74, 124 of the first and second accumulators 70, 120, respectively. The cycle of receiving bit groups, generating subsequent bits groups, and comparing the two then continues until there are no bit errors or the timer value exceeds the predefined timer value. Note that the second and third BS generators 50, 100 continue to accept new bit sequence seed values from the second and third SERDES 40, 90, respectively. Because there were one or more bit errors detected during the most recent bit group comparisons, it may be that the bit sequence seed values used to produce two of the compared bit groups may be invalid.

If the timer value is greater than the predefined timer value (step 336—Yes), the results of the comparison may be stored in the newly created database record 218 (step 356) and displayed via the user interface 206 (step 358). If steps 356 and 358 are reached in this fashion, the results will indicate that the test never establish that the DUT 170, the master device 180, and the BERT 1 are generally operating correctly.

Returning to step 332, if there are no bit errors (e.g., both accumulators 70, 120 are set to zero) (step 332—No), the microprocessor 130, under the direction of the control module 214, clears the value of the timer 150 (step 338) and directs the second and third BS generators to stop accepting bit groups from the second and third SERDES, respectively (step 339). The microprocessor 130 may clear the value stored by the timer 150 through its sixth I/O port 137 and the I/O port 152 of the timer 150.

Steps 338 and 339 preferably mark the end of the second phase and the beginning of the third phase. As indicated above, the second phase identifies bit sequence seed values for the second and third BS generators 50, 100. This happens when consecutive bit group are transmitted to the second and third BS generators without bit errors. This means that the second and third BS generators 50, 100 may now generate the exact bit sequence generated by the first BS generator 10 without additional bit sequence seed values from the second and third SERDES 40, 90, respectively. Subsequent bit errors by, for example, the DUT 170 would invalidate a calculated bit error rate if the second and third BS generators continued to accept bit groups from the second and third SERDES. Instead, the subsequent bit groups generated by the second and third BS generators will now be fed back to the second and third BS generators, respectively, as seed values to generate additional subsequent bit groups. The microprocessor 130 may direct the second and third BS generators to stop accepting bit groups from the second and third SERDES, respectively, by, for example, transmitting control signals through its second and third I/O ports 133, 134 to the I/O ports 52, 102 of the second and third BS generators 50, 100, respectively.

The second and third BS generators 50, 100 then generate a subsequent bit group from the "subsequent bit group" compared during the most recent execution of step 330 (step 340). This previous "subsequent bit group" is fed back to the BS generators 50, 100. The subsequent bit groups are transmitted by the second and third BS generators 50, 100 through their $D_{out}$ ports 56, 106 to the $D_{in}$ ports 64, 114 of the first and second comparators 60, 110, respectively.

Additional bit groups are received serially from the master device 180 and the DUT 170 through their $D_{out}$ ports 178, 188 by the $D_{in}$ ports 42, 92 of the second and third SERDES 40, 90, respectively (step 342). The second and third SERDES 40, 90 then transmit these bit groups through their $D_{out}$ ports 44, 94 in parallel to the $D_{in}$ ports 62, 112 of the first and second comparators 60, 110, respectively (step 344).

The comparators 60, 110 compare the bit groups received from the second and third SERDES 40, 90 and the second and third BS generators 50, 100 (step 346). The results of the comparisons are preferably numbers equal to the number of bits in the two sets of bit groups compared that do not match.

The results of the comparisons are output by the comparators 60, 110 through their $D_{out}$ ports 66, 116 to the $D_{in}$ ports 72, 122 of the accumulators 70, 120 and added to the values stored therein (step 348). The microprocessor 130, under the direction of the control module 214, then checks the bit error counts (i.e., the values stored in the accumulators 70, 120) to determine whether the two counts individually exceed a predefined bit-error value (e.g., a maximum bit error value) (step 350), which may be maintained by either the microprocessor 130 or the computer 160. The microprocessor 130 typically accesses these values through its fifth and seventh I/O ports 136, 138 and the I/O ports 74, 124 of the first and second accumulators, respectively. As noted above, the purpose of the third phase is to establish a bit error rate for the DUT 170. The test may be terminated if either of the two counts exceed this predefined bit-error value.

If either of the bit error counts are greater than the predefined bit-error value (step 350—Yes), the results of the DUT 170 test may be stored by the control module 214 in the newly created database record 218 (step 356) and displayed via the user interface 206 (step 358). If steps 356 and 358 are reached in this fashion, the results will indicate that the bit error rate, though not precisely calculated, exceeds the predefined bit-error value discussed above.

But if neither of the bit error counts exceed the predefined bit-error value (step 350—No), the microprocessor 130, under the direction of the control module 214, checks the value of the timer 150 (step 352). As noted above, the microprocessor 130 may read the value stored by the timer 150 through its sixth I/O port 137 and the I/O port 152 of the timer 150.

If the timer 150 value does not exceed a predefined timer value, which specifies the duration of a DUT 170 test (step 352—No), the cycle of receiving bit groups, generating subsequent bits groups, and comparing the two continues.

If the timer 150 value does exceed the predefined timer value, which means that the testing of the DUT 170 is complete (step 352—Yes), the control module 214 calculates bit error rates for the DUT 170 (step 354). This step may include the microprocessor 130 returning the bit error counts from the accumulators 70, 120 and the value of the timer 150 to the computer 160. Bit error rates may be calculated by dividing each bit error count by the value of the timer 150. One of the bit error rates characterizes the ability of the DUT 170 to transmits bits optically (i.e., transmit bits to the master device 180). The other bit error rate characterizes the ability of the DUT to receive bits optically (i.e., receive bits from the master device 180). Other formulas may be used without departing from the scope of the present invention.

The results of the DUT 170 test may be stored in the newly created database record 218 (step 356) and displayed via the user interface 206 (step 358). If steps 356 and 358 are reached in this fashion, the results will indicate the bit error rate for the DUT 170.

While preferred embodiments of the present invention have been disclosed, it will be understood that in view of the foregoing description, other configurations can provide one or more of the features of the present invention, and all such other configurations are contemplated to be within the scope of the present invention. Accordingly, it should be clearly understood that the embodiments of the invention described above are not intended as limitations on the scope of the invention, which is defined only by the claims that are now or may later be presented.

For example, in some embodiments, the control module 214 may direct the microprocessor 130 to configure the BS generators to transmit data serially. In these embodiments, the SERDES illustrated in FIG. 1 are not used. Instead, bits are transmitted from the BS generators to external devices (i.e., the DUT 170 and the master device 180) from the external devices to the BS generators and comparators.

In still other embodiments, the timer 150 is set to a count that represents the specified duration of a DUT 170 test. The timer 150 then counts to zero by reference to received clock signal pulses. Once the value stored by the timer 150 reaches zero, the timer 150 disables the comparators 60, 110 to prevent additional comparisons and signals the microprocessor 130 that the test of the DUT 170 is complete.

What is claimed is:

1. A system for detecting a bit processing error, including a first circuit, a second circuit, and comparison circuitry; the first circuit configured to generate a first sequence of bit groups by reference to a controlling pattern, the first circuit further configured to transmit said first sequence of bit groups to a first external device, said first external device configured to transmit a second sequence of bit groups to a second external device, said second sequence of bit groups derived by the first external device from the first sequence of bit groups;

the second circuit configured to receive a third sequence of bit groups from the second external device, said third sequence of bit groups derived by the second external device from the second sequence of bit groups, said second circuit further configured to generate a subsequent bit group from a first group of bits in the third sequence of bit groups by reference to the controlling pattern;

the comparison circuitry configured to receive the third sequence of bit groups from the second external device; and the comparison circuitry further configured to execute a comparison of the subsequent bit group to a second bit group in the third sequence of bit groups, said second bit group following the first bit group in said third sequence of bit groups, whereby an unsuccessful comparison is indicative of a bit processing error.

2. The system of claim 1, further comprising a fourth circuit to receive each bit group in the first sequence of bit groups from the first circuit in parallel, said fourth circuit configured to serially transmit said each bit group to the first external device.

3. The system of claim 1, further comprising a fifth circuit to serially receive each bit in the third sequence of bit groups from the second external device, said fifth circuit configured to transmit said each bit group in the third sequence of bit groups in parallel to the second circuit and the comparison circuitry.

4. The system of claim 1, further comprising accumulation circuitry to track unsuccessful comparisons executed by the comparison circuitry, wherein each unsuccessful comparison executed by the comparison circuitry causes a count maintained by the accumulation circuitry to be incremented.

5. The system of claim 4, further comprising
controller circuitry configured to initiate the generation of the first sequence of bit groups by the first circuit; and
the controller circuitry further configured to check the count maintained by the accumulation circuitry following each bit group comparison by the comparison circuitry, wherein said controller circuitry is configured to direct the second circuit to generate additional subsequent bit groups only from subsequent bit groups generated by said second circuit and clear the count maintained by the accumulation circuitry when said count maintained by said accumulation circuitry does not indicate an unsuccessful comparison.

6. The system of claim 5, further comprising timer circuitry to maintain a count of the number of comparisons by the comparison circuitry following a first successful comparison by said the comparison circuitry, wherein a bit error rate is a function of the count maintained by the accumulation circuitry and the count maintained by the timer circuitry.

7. The system of claim 4, wherein
the second circuit is configured to generate a plurality of subsequent bit groups; and
the comparison circuitry is configured to execute a comparison against a corresponding bit group in the third sequence of bit groups for each subsequent bit group in the plurality of subsequent bit groups.

8. The system of claim 7, wherein a bit group corresponds to a subsequent bit group when said bit group and said subsequent bit group occupy identical positions within their respective sequences of bit groups, said respective sequences of bit groups generated by reference to the controlling pattern.

9. The system of claim 1, wherein the first sequence of bit groups is a pseudo random sequence of bits.

10. The system of claim 1, wherein each bit group in the first sequence of bit groups that immediately follows a preceding bit group is a function of said preceding bit group such that said each bit group is generated from said preceding bit group.

11. The system of claim 1, wherein the first external device is a pre-tested device and the second external device is a device under test.

12. The system of claim 1, wherein the second external device is a pre-tested device and the first external device is a device under test.

13. The system of claim 1, further comprising a duplicate second circuit and a duplicate comparison circuitry, wherein
the first circuit is further configured to transmit said first sequence of bit groups to the second external device, the second external device configured to transmit a fourth sequence of bit groups to the first external device, said fourth sequence of bit groups derived by the second external device from the first sequence of bit groups;
the duplicate second circuit is configured to receive a fifth sequence of bit groups from the first external device, said fifth sequence of bit groups derived by the first external device from the fourth sequence of bit groups, said duplicate second circuit further configured to generate another subsequent bit group from a first group of bits in the fifth sequence of bit groups by reference to the controlling pattern;
the duplicate comparison circuitry is configured to receive the fifth sequence of bit groups from the first external device; and
the duplicate comparison circuitry is configured to execute a comparison of the another subsequent bit group to a second bit group in the fifth sequence of bit groups, said second bit group in the fifth sequence of bit groups following the first bit group in said fifth sequence of bit groups, whereby an unsuccessful comparison is indicative of a bit processing error.

14. The system of claim 13, further comprising duplicate accumulation circuitry to accumulate results of comparisons executed by the duplicate comparison circuitry, wherein each unsuccessful comparison executed by the duplicate comparison circuitry causes a first count maintained by the duplicate accumulation circuitry to be incremented.

* * * * *

UNITED STATES PATENT AND TRADEMARK OFFICE
CERTIFICATE OF CORRECTION

PATENT NO. : 7,082,556 B2
APPLICATION NO. : 10/285081
DATED : July 25, 2006
INVENTOR(S) : Fishman et al.

It is certified that error appears in the above-identified patent and that said Letters Patent is hereby corrected as shown below:

<u>Column 4</u>
Line 10, after "and", change "an" to --a--

<u>Column 5</u>
Line 64, change "and a seventh I/O port 138" to --a seventh port 138, and eighth port 139, and a ninth port 140--
Line 66, change "134" to --132--

<u>Column 6</u>
Line 4, change "132" to --131--
Line 28, change "110" to --145--
Line 31, change "110" to --145--

<u>Column 7</u>
Line 47, change "mater" to --master--
Line 64, change "367" to --212--

<u>Column 8</u>
Line 9, change "210" to --162--

<u>Column 11</u>
Line 9, change "10" to --110--
Line 11, change "104" to --54--
Line 28, change "accumulator" to --comparator--
Line 38, change "accumulator" to --comparator--

UNITED STATES PATENT AND TRADEMARK OFFICE
CERTIFICATE OF CORRECTION

PATENT NO. : 7,082,556 B2
APPLICATION NO. : 10/285081
DATED : July 25, 2006
INVENTOR(S) : Fishman et al.

It is certified that error appears in the above-identified patent and that said Letters Patent is hereby corrected as shown below:

Column 15
Line 25, change "said the" to --the said--

Signed and Sealed this

Twenty-sixth Day of August, 2008

JON W. DUDAS
*Director of the United States Patent and Trademark Office*